J. W. CULMER.
COMPUTING SCALE.
APPLICATION FILED APR. 17, 1895.

1,054,180.

Patented Feb. 25, 1913.
6 SHEETS—SHEET 1.

Fig. 1.

Witnesses
James S. Smith
Frank B. Marlow

Inventor:
John W. Culmer,
By Chas. F. Benjamin.
Attorney.

J. W. CULMER.
COMPUTING SCALE.
APPLICATION FILED APR. 17, 1895.

1,054,180.

Patented Feb. 25, 1913.
6 SHEETS—SHEET 3.

J. W. CULMER.
COMPUTING SCALE.
APPLICATION FILED APR. 17, 1895.

1,054,180.

Patented Feb. 25, 1913.
6 SHEETS—SHEET 6.

UNITED STATES PATENT OFFICE.

JOHN W. CULMER, OF BEAVER FALLS, PENNSYLVANIA, ASSIGNOR, BY MESNE ASSIGNMENTS, TO NATIONAL SCALE COMPANY, A CORPORATION OF PENNSYLVANIA.

COMPUTING-SCALE.

1,054,180. Specification of Letters Patent. Patented Feb. 25, 1913.

Application filed April 17, 1895. Serial No. 546,037.

*To all whom it may concern:*

Be it known that I, JOHN W. CULMER, a citizen of the United States, residing at Beaver Falls, in the county of Beaver and State of Pennsylvania, have invented certain new and useful Improvements in Computing-Scales; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to so-called price scales, and its object is to improve the construction and arrangement of parts in a scale of that class intended particularly for counter use, and, by means of such improved construction and arrangement, to produce a computing counter scale having a high degree of practical utility.

In the accompanying drawings, wherein like letters represent like parts.

A represents the hollow base of the scale; B, a pair of oppositely placed standards at the front end of the base; C, a narrow plate resting upon those standards; D, a standard rising from the plate near the right hand side of the base; E, a standard at the front and center of the base; F, a standard toward the rear and center of the base; G, the weighing pan, load receiver or platform; H, the supporting frame thereof; $a$, the leg of said frame, and $b$, the pivotal bar, within the hollow of the scale base, connecting with said leg, as usual in counter scale construction.

Figure 6:
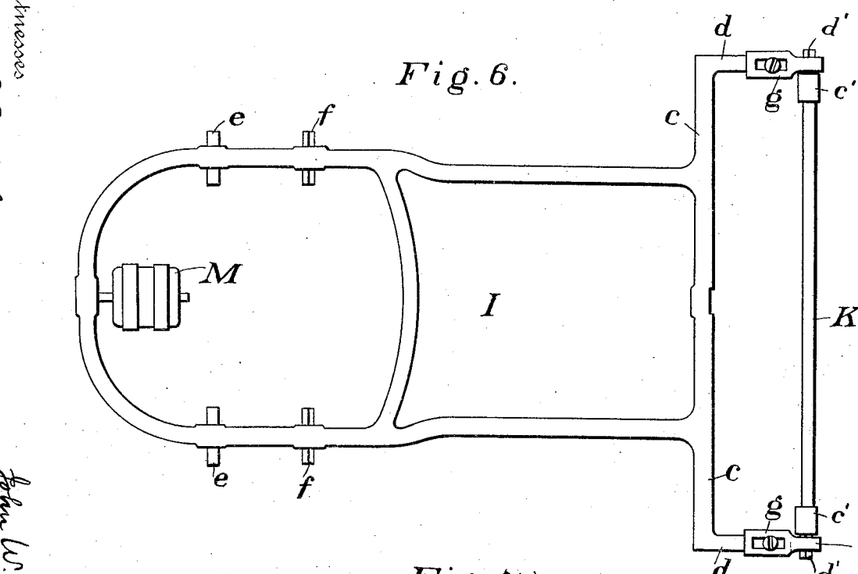
Fig. 6, a plan view of the preferred form of lever through which the movement of the weighing is imparted to the computing parts of the scale.
Figure 7:
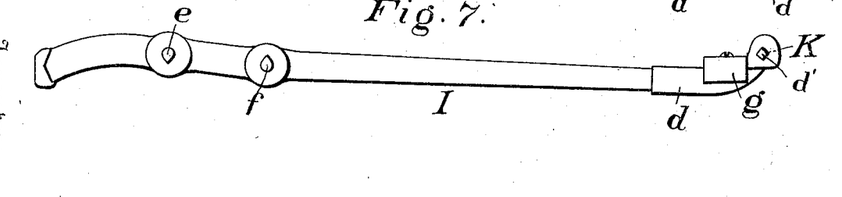
Fig. 7, a side elevation thereof.
Figure 8:
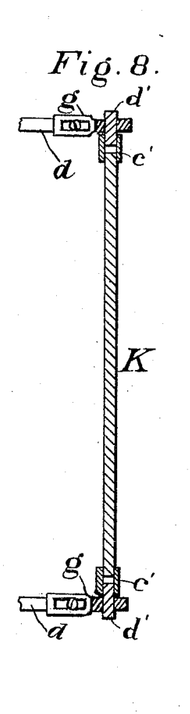
Fig. 8, a vertical longitudinal section through the front extremities of the lever.
Figure 9:
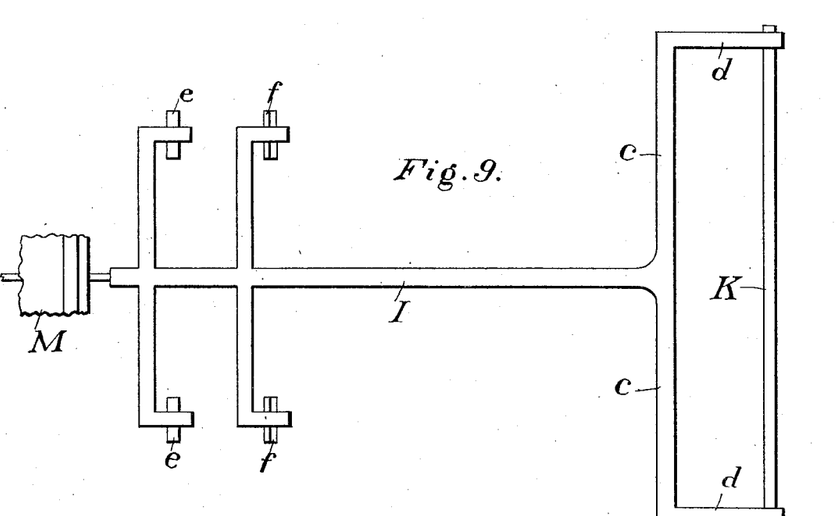
Fig. 9, a top plan of the said lever modified into a simpler form.

The lever, I, is an important element in the scale. It is substantially horizontal, as shown in Figs. 6 and 9; yet any convenient curving in its side outline, as indicated in Fig. 7, is not to be taken as a departure from its true construction. Its width is governed by the needed length of the guide bar at its front end, but the preferable construction is to make the main part of it wide enough to librate it steadily upon the standard, E, of the scale base, by means of knife edge fulcrum pivots, $e$, provided upon the lever and to spread it out at front into lateral arms, $c$, which are bent forward into fingers, $d$, for the support of the long bar at its ends. Knife edge pivots, $f$, on the lever support the frame of the weighing pan, and at the rear of the lever is a horizontally and longitudinally adjustable weight, M, to put the lever in balance for a proper working of the scale. Applicant does not limit himself to any particular arrangement of the weighing pan pivots with respect to the fulcrum pivots.

In my construction of the whole scale it has been the more convenient to place these two sets of pivots relatively as shown. But, although I have above described in detail the illustrated construction and arrangement of the parts referred to, it will be understood that the essential parts of my invention can be employed in scales having modified load levers and modified platforms or load receivers.

The guide bar, K, connected to the forward end or ends of the lever should be parallel with the fulcrum pivots of the lever, and it must not bind when the lever librates. To provide for these necessities I adjustably mount bracket or carrier, $g$, having an upward extending part on the tip of each of the fingers, d, whereby to keep the bar parallel with the fulcrum pivots, and horizontally and crosswise, through the upward extending part of each bracket I put a knife edge pivot, d', to support a hollow ferrule, e', on the end of the bar to insure to the latter a free swing upon its supports. But I may use any other and familiar means to provide this parallel adjustment and this swinging movement for said bar.

In Fig. 6 the essentials of my lever, I, are plainly to be seen. At the front is the long, narrow bar, K, supported only at its ends and otherwise unobstructed throughout its length. Toward the rear are parallel pivots, or pairs of pivots, e and f, to respectively support the lever upon its standard and the weigh pan frame upon the lever, and these pivots must have crosswise extension enough, from the longitudinal center of the lever, to support their burdens steadily in the libration of the lever. At the rear there must be an adjustable weight, M, to put the lever in balance upon its fulcrum, and the bar, K, at the front, must have enough horizontal movement in or upon its supports to adjust it to a parallel with the fulcrum pivots, and also a swinging movement when the lever librates. These essentials of construction being attended to, the frame-work of the lever may be as in Fig. 6 or Fig. 9, or in any other suitable form that accommodates the other parts of it in the manner, with the effect and in the relation just stated.

Figure 2:
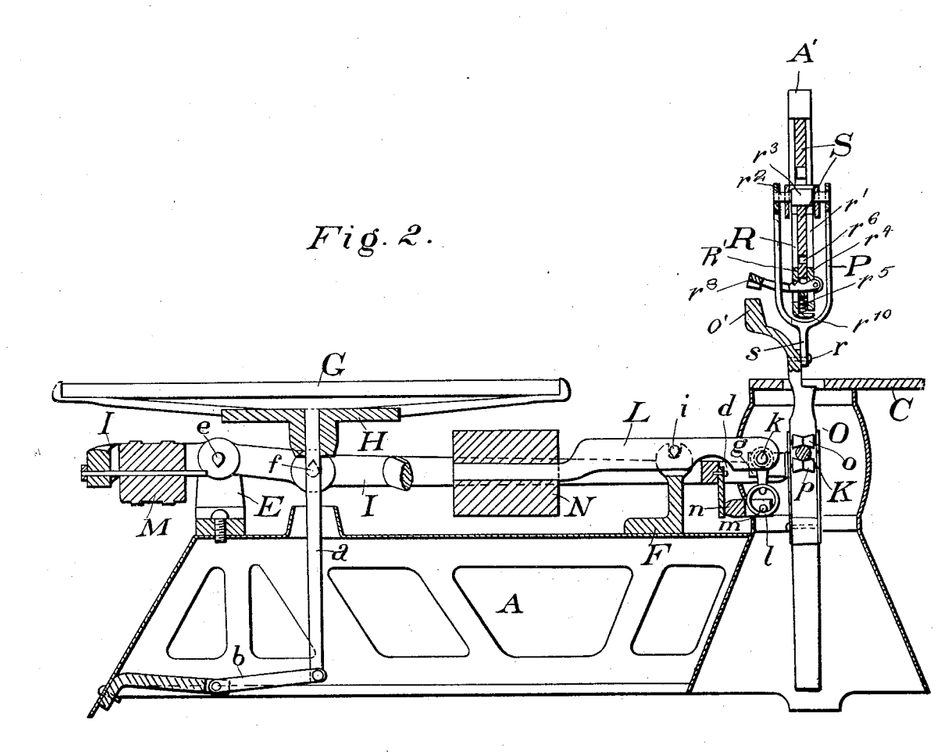
Fig. 2, is a section on the line 2—2, Fig. 1.
Figure 10:
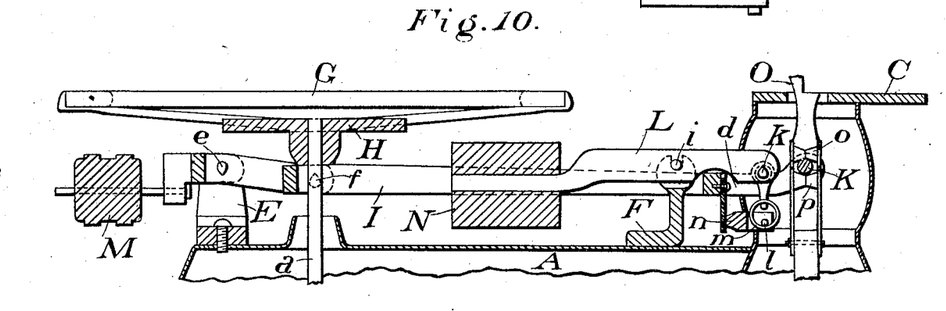
Fig. 10, a right side view, with parts in section, showing in place and connection the aforesaid lever in its modified and simpler form.
Figure 11:
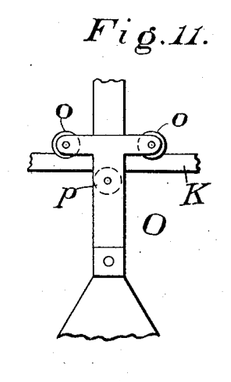
Fig. 11, a front elevation of the lower part of the trolley which forms one of the elements of the scale in place upon the trolley carrying bar which forms the front of the aforementioned lever.

L is a long, thin bar lever, well shown in Figs. 2 and 10, having a cross knife edge pivot, i, which libratingly supports it upon the standard, F, of the scale base. Its front end, like that of the lever, I, is toward the rear of the scale, and here the two levers are coupled in any suitable way. I show them coupled by a link, l, which depends from a pivot, k, in the bar lever and engages a pin, m, in a bracket, n, projected from the under part of the principal lever. The rear end of the bar lever is fitted with a longitudinally adjustable weight, n, and the whole function of this auxiliary lever is to assist in putting the lever, I, into balance in cases where, as a matter of taste, judgment or economy, I prefer not to dimension or weight the parts of the lever, I, so as to make its weight, M, do all the work of balancing.

Any well known means can be used for adjusting the weights M and N. The common practice of scale makers long followed, is to have a weight like that at M attached to its holder by a screw thread, and to have weights like that at N slidable along their levers or beams, sometimes with and sometimes without set screws. Numerous ways for adjusting and fastening such weights being well known, it is unnecessary to here illustrate them in detail.

O is a trolley that rests upon and rides along the bar, K, at the front of the main lever. For easy movement it may have a pair of wheels, o, engaging the upper edge, and it may have also a wheel, p, to engage the under edge of the bar. The lateral extension given to the trolley at the cross plane where it rests on the supporting bar is a preferable feature of its construction, to avoid oscillation when it is moved on the bar.

Figure 3:
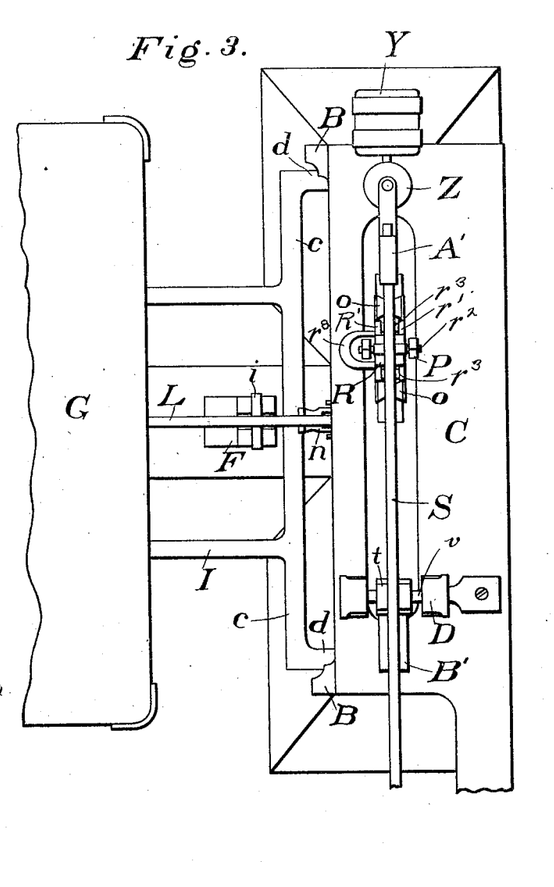
Fig. 3, a top plan thereof.
Figures 4, 12:
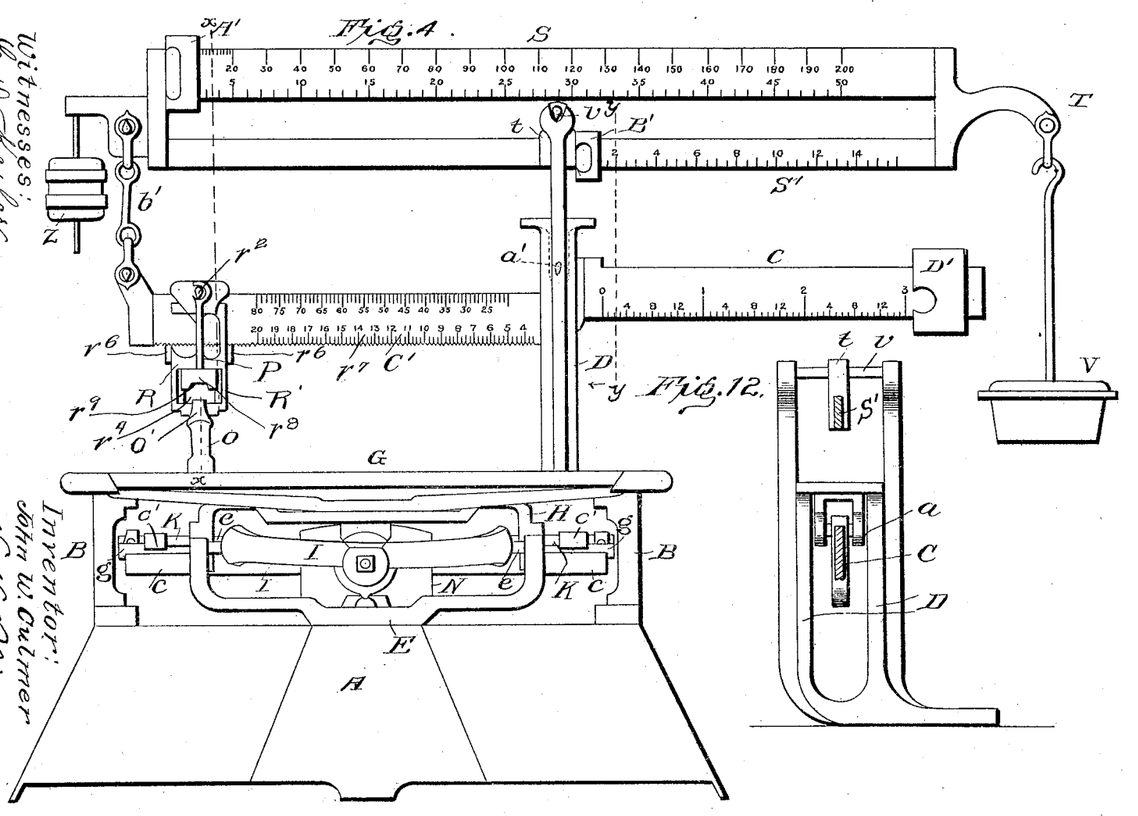
Fig. 4 is a front elevation of a scale having a beam system in which two independently mounted beams are employed, one directly above the other.
Fig. 12 is a section on the line $y$—$y$ of Fig. 4.
Figure 5:
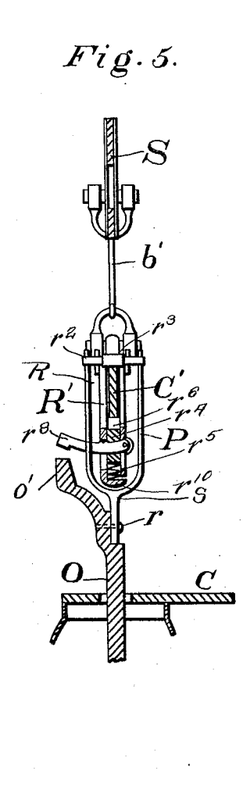
Fig. 5 is a vertical cross section on line $x$—$x$, Fig. 4, near the left hand end, and with some parts left in elevation.

A long vertical link, P, ends at bottom in a slender stem, s, by which the link is pivoted, by a screw, r, to the rear face of the trolley above the supporting bar; the trolley there curving forward, as seen in Figs. 2 and 5, to enable the link, which vertically is at a right angle with the trolley, to move from side to side. The link, P, carries a hollow block, R, shown in elevation in Figs. 1 and 4, in top plan in Fig. 3, and in vertical cross section in Figs. 2 and 5: the block swinging in the link by means of a pivotal connection at the head of both, and the two parts being at right angles, so that the block and the trolley face the same way.

S is the scale beam, integral at its ends, but between them severed into an upper and a lower bar, and the lower bar divided by a straight edged center block, t, into a right and left section. The left section is the price bar and, in Fig. 1, I have shown it, from right to left, graduated into spaces of one-half cent each. The right section I will call the weight bar, and, along the lower edge, I have shown it graduated, from left to right, into one ounce spaces. But, inasmuch as many operations call only for price and value, I have used the upper edge of this weight bar for value marking, and have graduated it, from left to right, into value spaces of one cent each. The whole of the upper bar I arrange like the weight bar, except that the lower markings represent each half an ounce, instead of an ounce, and the upper markings each half a cent, instead of one cent. Various other arrangements of the upper bar and the right section of the lower bar are, of course, open to the choice and skill of the scalemaker.

The scale beam is libratingly supported on or in the standard, D, by a knife edge pivot, v, passed through the center block of the lower bar. It preferably has the familiar goose-neck, T, to carry the swinging seat, V, for the accommodation of the customary multiplying poises. As the beam is not balanced by, with or from the lever, it must have adjustable means of its own to put it in balance, and these are mostly conveniently placed at the left hand end of the beam. Any proper weight, moving out and in from the end of the beam, would answer, but having regard to the width of the beam in proportion to its thickness, and the circumstance of its being fulcrumed at a point so near the bottom, and by a short sharp edged pivot, I have found it an advantage to project the balancing weight, Y, from a block, Z, having a vertical movement between the top and bottom edges of the beam, whereby I can steady the beam when putting it in balance.

Figure 1:
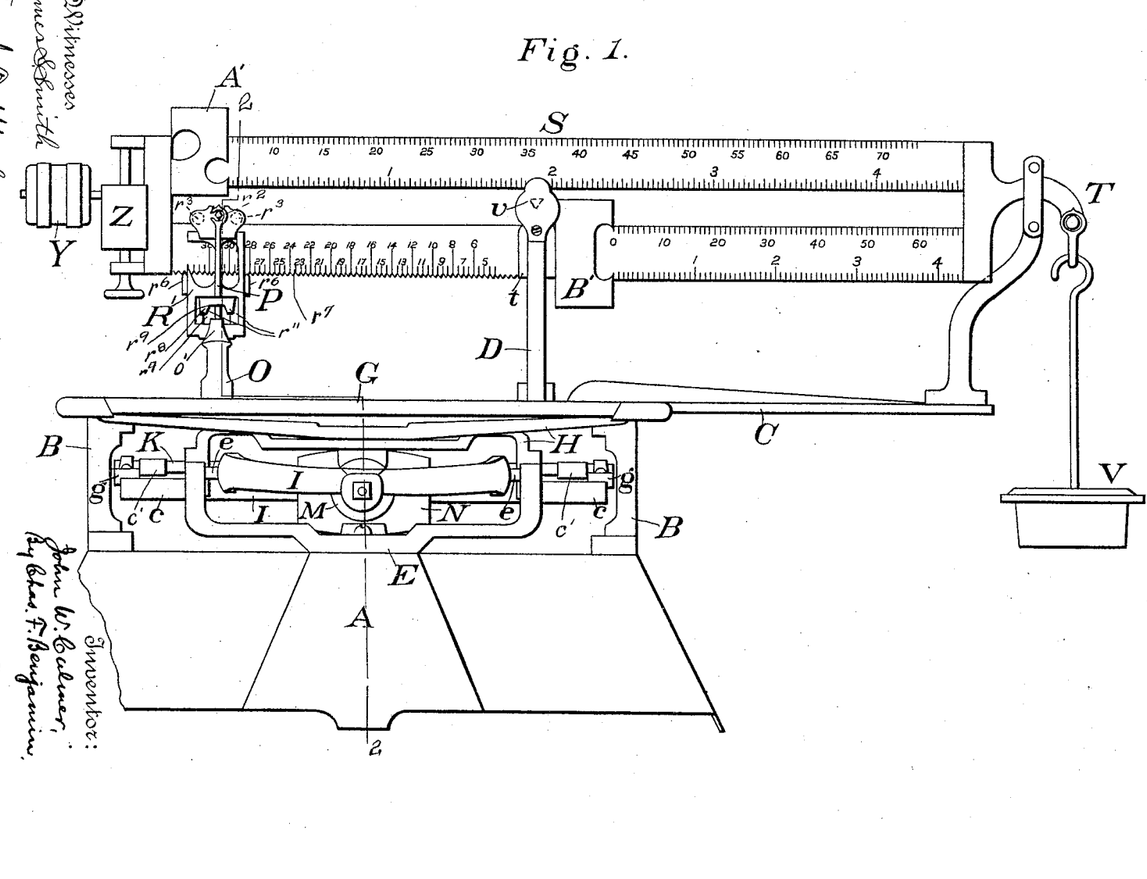
Figure 1 is a front elevation of an entire scale of my improved construction.

It is well shown in Figs. 1 and 2 that the trolley-borne, hollow block, R, incloses the price bar and moves along it to and fro, and it is the length of the price bar that determines the proper length of the trolley guide bar supported on the forward end of the main lever. But the block is not balanced with the beam, for its whole weight falls upon the lever and is balanced by the lever balancing arrangements. This block and its attachments are constructed as follows: It has a plate, R', in front of the beam; a plate, r', behind the beam; a knife edged pivot, $r^2$, above the beam extending from side to side for the clevis, P; rollers, $r^3$, resting upon the top of the beam; a plate, $r^4$, between the plates, R' r'; a spring or springs, $r^5$, below the plate and resting on the lug, $r^{10}$, at the bottom of the plates R' r', and between them; the dogs, $r^6$ $r^6$, on the plate, $r^4$, normally pressed up into the notches, $r^7$, on the under edge of the beam; the thumb lever, $r^8$, pivoted to the rear plate, r', and extending to the front and engaging with the plate, $r^4$. This thumb lever, $r^8$, is recessed at its front end, as shown at $r^9$, the two edges, $r^{11}$ $r^{11}$, being adapted to engage with the projection, o', on the trolley part, O. This projection has two separated bearings at its tapering sides, and the part, $r^8$, is adapted to have the tapered edges of the recess in its outer end seated against the bearing surfaces on the part O'. When the thumb lever is pressed down it effects a union of the three parts of the draft transmitter of such sort that they will be held in vertical alinement when the trolley is being moved from one place to another along the beam and guide. The upper bar of the scale beam has its proper sliding poise, A', and the weight bar its proper poise, B'; both common and familiar throughout, and because the spacings of the two bars are of equal width, while their values on the lower bar are double those of the upper bar, it follows that the lower poise must be double the weight of the other. To test the scale for accuracy, put the whole of it in balance. Then place a known one pound weight in the weight pan, which unbalances the scale and pulls down the left end of the beam. Run out either of the sliding poises from its normal place of rest at the left hand extremity of its bar till it points at the one pound mark. Then move the hollow block along the price beam until it points to the mark which indicates the point that has been predetermined as the place where the draft is to be applied when using the scale for ascertaining pounds or ounces, and which I herein refer to as the pound mark. Then, if the scale balances when the block points at the pound mark, the scale is accurate, and thereafter, whenever the block is set at the pound mark, any weighing operation within the limits of the scale can be safely performed. To ascertain the value of a commodity in the weighing pan at a given rate, set the pointer of the block, R, at the rate mark and move out either of the sliding poises till the scale balances, when the sliding poise will point at the value in the upper row of markings. If the weight is then desired, set the hollow block at its pound mark, and balance the scale with either of the sliding poises and its lower pointer will tell the weight.

In Fig. 4 I have shown a construction in which two graduated beams are employed, one directly above the other. The stationary frame, as the standard, D, is carried up high enough to provide independent pivotal supports for these beams, S S' and C C'. The two beams are in the same vertical plane and arranged so that they will both vibrate without either throwing the other out of operative position, and so that the graduations upon each can be easily read, being, as stated, in the same vertical plane.

It will be understood that the parts shown in Figs. 4 and 5 are used in conjunction with others, which are similar to those above described, such, for instance, as shown in Figs. 2, 10, etc. Inasmuch as this construction shown in Figs. 4 and 5 is capable of being used in either of several ways, I will describe some of them, in order that the construction and the relation of the parts may be clearly understood.

First: Should it be desired to ascertain the weight in pounds and ounces, of a given mass, the draft transmitter, O, P, R, is moved along the guideway, K, and along the bar, C', to the point indicated by 16. Assume the mass to weigh three-fourths of a pound, this will be indicated when the sliding poise, B', on the weighing bar, S', reaches the point marked 12. In this particular instance the weighing beam or bar, S', is marked and balanced so that it is capable of indicating avoirdupois weight up to sixteen ounces. If the weight of the mass should exceed that above assumed, it can be ascertained in any of the now well known ways; for instance, by multiplying poises, such as above referred to, attachable to the counterpoise, V, as usual, or, in the way shown in my earlier Patent 552,826, namely, by utilizing the right hand end, C, of the lower beam and providing it with a heavy poise, D', which, when counterbalanced properly, can be used to indicate corresponding heavy weights on the platform. The draft on the beam from the platform or pan is transmitted from the platform lever to the guide bar, K, and from that to the bar, C', and to the beam S through the transmitting devices, which here consist of the link, $b'$, between the beams and the draft devices, O, P, R. By having the upper weighing beam directly in the vertical planes of the price bar, accuracy is insured both in operation and in the readings.

Second: Should it be desired to ascertain the value of the mass, the following steps are taken. The trolley or draft transmitter is placed at the numeral indicating the price per pound, and then poise, A', is moved till bar, S, is balanced, and at the point where it rests will be the graduation indicating the total value, at the price indicated on bar, C'. The rates per pound run from one to twenty cents, along the lower edge of bar, C', with quarter cent fractions, and from twenty to eighty cents along the upper edge of the bar, with even one cent graduations. On value bar, S, the top readings correspond with the top readings on bar, C', and the lower readings with those on the bottom of bar, C'. As shown, the supplemental weighing bar, C, is graduated to indicate even ounces up to three pounds.

From what has been described, it is seen that the present invention provides a computing scale which retains many of the desirable features that I have employed in other forms (such as that shown in my Patent 552,826 of January 7, 1896), but in the present construction the draft is exerted directly, practically, by the load carrying lever upon the computing beam, and dispenses with the one or more intermediate levers, each with a fixed fulcrum interposed between the load levers and the beam.

The construction I herein present possesses as one of its features of superiority this, that the guide bar (as at K) is supported, not at one end only with a consequent liability for its ends to rise and fall relatively to each other and thus destroy the accuracy and operativeness of the scale, but at both ends, so that as it begins to move downward under the load it does not tend to depart from a horizontal position, my construction in this respect being readily distinguishable from those in which the guide bars are supported at one vertical line only. But in the present construction, as has been above described, the guide, K, is at each of its ends connected directly with the rising and falling ends of the weight carrying lever, and it, at both ends, rises and falls with the latter in horizontal parallelism, that is to say, so that in each and all of its positions it is substantially parallel to the horizon. Moreover, this guide, as above set forth, is allowed to move axially with relation to the weight carrying lever because of the two knife edges or pivotal connections, $d'$ $d'$, between them.

The parts, $g$, which support the guide bar, K, are shown as projecting a suitable distance from the levers, their upright dimension being governed by the position vertically of the computing beam. When the beam is relatively low, as in the construction shown, the guide bar can be correspondingly near the load supporting lever, and vice versa. The distance from the guide to the beam, and, therefore, the upright dimension of the parts, $g$ $g$, depend on the flexibility required in the draft transmitting parts, indicated herein principally by O, P and R. The part, O, is loosely connected to the guide, K, the loop, P, is loosely connected to the part, O, by the pivot, $r$, and the part, R, is loosely connected to the loop, P, by the loose eyes and knife edges at the upper end. These parts eliminate cramping and binding and the consequent errors in the scales which are otherwise constructed, as concerns the draft transmitter. And it will be seen that to allow for the presence of these loosely connected parts, the guide should be a suitable distance below the beam. As the beam herein is quite low, the guide carrying parts, $g$, have their vertical dimension comparatively small. A beam elevated a little farther, relatively, than that herein is illustrated in my application No. 596,246, filed June 20, 1896, and a still more elevated one is shown in my application, No. 569,493, filed November 30, 1895.

I do not herein claim the specific features of construction (shown in said other applications) incident to the guide bar therein, namely, two prolonged legs or supports interposed between the guide and the platform lever, preferring to claim herein the generic features incident to having the guide bar supported vibratably on the platform lever directly.

In all lever scales there is danger of inaccuracy from the fact that the platform or load carrying levers vibrate vertically in one plane or planes, while the beam vibrates in planes at right angles thereto. The load lever tends to move the beam not only around its horizontal pivot (which is the desired movement), but also around a vertical pivot, pushing it forward or backward. This latter component of its motion interferes with the correct measurement of its gravity component. And one of the causes of the practical success of scales, which I have devised like that herein, lies in the fact that I reduce to a minimum this horizontal distortion of the beam and arrange the parts so that the gravity is applied to the beam by a downward pull and not by an upward pull or thrust. The supplemental lever and weight at L, N, act to counterbalance the platform or load receiver, the load levers, the guide bar, K, and the trolley or draft transmitting devices, all of the said parts including the weight, N, and lever, L, constituting one balance system, while the computing beam or beams constitute another system which is balanced within itself and independently of the aforesaid parts.

I am aware that at the time of the issue of this patent it is well known that a supplemental lever and weight, such as at L, N, can be used not only for this purpose of balancing the platform system of parts and the draft transmitter, but can be so placed and utilized as to serve as means for readily ascertaining weight in pounds and ounces; and I do not herein specifically claim such arrangement and use of this lever and weight. But I believe myself to be the first to have devised a construction having a guide bar loosely or vibratably connected at both ends to the platform lever and adapted to turn on a horizontal axis adjacent to said levers, combined with a draft transmitting device extending upward therefrom to the computing beam, together with a supplemental lever and adjustable weight, connected to the guide bar and the platform lever, and adapted to counterbalance them independently of the computing system.

By having the computing beam mounted substantially at its center longitudinally I am enabled to place the guide bar, K, and the draft transmitting devices directly back of the pan or platform, that is to say, so that they shall lie in the vertical longitudinal planes of the pan or platform; or, in other words, I arrange the load receiver, pan or platform, the load carrying lever, the platform pivots, the lever fulcra, the rising and falling guide bar, K, and the price or rate section of the computing beam in such way that they shall all be symmetrically disposed relatively to the central longitudinal vertical plane of the load receiver. And it will be seen that the operative parts are so arranged that the greater number of them lie between the vertical longitudinal plane of the right hand edge of the load receiver and the plane at the left hand edge. And in this respect the present construction is to be contra-distinguished from the others of the same general class, both those in which the computing mechanism was situated entirely in planes outside of those of the platform or load receiver, and those in which the computing mechanism (including the long heavy beam, its standard and their carriage) had to be all moved back and forth for a distance of many inches. In either case there was a wide difference when compared with the condensed and compact arrangement of parts which I have devised, which enables me to keep all of them not only in permanently uniform relation to each other as concerns their axis or lines of vibration, but also so that each part shall act permanently uniformly on both sides of its axis in receiving the weight or force and transmitting it to the next. I not only make the mechanism as a whole compact as a matter of convenience, but also more accurate, first, because the draft can be transmitted to the computing beam on direct and short lines, and, second, because a limited area only is required for the base of support, which can, therefore, be readily made and kept level throughout, such levelness being, as is well known, necessary in an accurate placing of these scales.

I have, as before stated, illustrated two mechanisms herein, one in Fig. 1 and others, and the other in Figs. 4 and 5, and prefer to present herein claims for the features common to both the said constructions and also specific claims for the matters embodied in the mechanism in Figs. 4 and 5.

For convenience of description, in setting forth the relative positions of some of the parts, I refer to the "vertical planes of the pan, load receiver, etc." By the "longitudinal vertical planes of the load receiver, the pan, the load, etc.," I mean those vertical planes which are transverse to the computing beam and which pass through the pan or load receiver; and by the "central longitudinal vertical plane" I mean that passing through the center of the pan and coincident with or parallel to the plane on which is taken the section shown in Fig. 2, as above described.

I do not herein claim, or intend to have the claims herein include, a scale mechanism having a price beam, a platform lever, a guide bar adjacent to the price beam, and supported by a single connection with the platform lever. I herein refer to the "widened end of the platform lever," also to the platform lever having a "pair of knife edge connections" and to the fact that the guide device is "pivotally connected to the platform lever at two points." By these and kindred terms I mean that the guide device has a wide base or hinge support and is so held that it can be carried, in the way above described, in true horizontal parallelism at all times; and further refer to the fact that the platform lever is extended outward, and at its outer free end has laterally extended arms, as at $c, c$, which are provided with knife edge pivots, $d'$ $d'$, which are the means for giving the wide base of support above mentioned.

I herein refer to the guide bar as being supported directly on the platform lever, and wish to be understood as distinguishing this construction from those in the earlier art, typified, for instance, by the mechanism illustrated in my Patent, No. 552,826, and that in the patent to Daniels, No. 530,930. In my earlier scale the guide bar was not supported directly on the platform lever in the sense intended in the present description. Nor was the guide bar in the construction of Daniels so supported. In both cases there were various parts and pivots supported on the main frame to carry the guide bar and interposed between it and the platform lever, and requiring the presence of links and other devices which it is my purpose here to dispense with. I do not, however, limit myself to having the guide bar situated exactly as shown, in relation to the platform lever, so long as its weight is taken directly upon the lever, and it is connected thereto pivotally or freely, so that it can swing or vibrate in relation thereto.

It will be understood that the counterbalancing lever or beam has as one of its purposes to hold up the guide bar K in proper position, and with it the trolley, the head block and their clevis. While as a matter of mere convenience, in the present scale I have shown the first attachment for this counterbalancing lever as connected with the platform lever and not directly connected to the guide, yet it will be seen that this is one manner of providing an intermediate connection for the counterbalancing lever with the guide bar. I do not herein make specific claim for particular details beyond those illustrated and described, preferring to herein claim the generic features broadly incident to supporting a guide bar directly upon the platform lever at two points and combining therewith any suitable supplemental balancing lever which can be adjusted to take the weight of the guide bar and of the trolley, and hold them up in proper position.

The guide for the sliding connecting block is held by the devices herein in such way as to move independently of the fixed frame work, except in so far as it is guided by the platform lever, it differing in this respect from constructions that have been proposed having a vertical rod or bar hinged at one point only to the platform lever and carrying a rigid guide at the top and at a point between the guide and platform lever connected to the counterbalancing lever by a pivot firmly seated in a seat in the said vertical rod. In that proposed construction the counterbalancing lever was pivoted to the framework and therefore the guide could not move independently of the frame. But in this construction the position of the guide as to horizontal lines is not affected by the fixed frame work, and therefore it can move independently thereof as concerns its necessary function.

What I claim is:

1. In a scale, the combination of a frame, a load-carrying lever mounted on the frame, the pan or load receiver, the longitudinally stationary, vertically-vibrating price beam, the head block adjustable on the price beam, a horizontal guide for the head block, two rising and falling holders for the said guide connected to the load carrying lever, one at each end thereof, upon which holders the guide can move around a longitudinal axis, and a balancing mechanism supported on the scale frame for sustaining the weight of the guide bar and of the load receiver, substantially as set forth.

2. In a scale, the combination of a longitudinally stationary computing beam, the load carrying lever having a guide bar vibratably connected directly thereto at both ends of the guide bar, the latter being held thereby continually in horizontal parallelism, and a draft transmitter positively engaging with the said guide bar whereby it moves therewith approximately vertically in either direction, said draft transmitter being longitudinally adjustable both on said beam and on said guide bar, and being vibratable together with the guide bar relatively to the load carrying lever.

3. In a computing scale, the combination of a load-carrying lever, guide supports connected to said lever, a guide, K, loosely engaging said supports whereby it can move around a longitudinal axis, a longitudinally stationary computing beam, a draft transmitter connected to the computing beam and having a sliding guide fitted to the vibrating guide, K, and a weight rigidly secured to the sliding guide and depending below the guide, K, substantially as set forth.

4. In a computing scale, the combination of a base, a lever resting at two remote fulcrum points on the base, and having two rearwardly extending widely separated arms, a knife edged pivot secured to each of said arms, the pan or load receiver resting on the lever at two remote pivot points in a line parallel to that of the lever fulcra, a uniformly horizontal guide bar resting loosely on both the said widely separated knife edged pivots carried by the load lever, a longitudinally stationary computing beam above the guide bar, a draft connection or transmitter engaging with and adjustable longitudinally on the computing beam, and having a slide guide fitted to the aforesaid guide bar on the load lever, and the weighted lever supplemental to the platform lever and to the computing beam, and having connection with the platform lever independently of the connection for the computing beam, substantially as set forth.

5. In a computing scale, the combination of a base, a load carrying lever fulcrumed on the base, a pan or load receiver supported on said lever, an independently counterbalanced computing beam, a uniformly and continually horizontal guide bar supported by two remote pivots on the load lever, a draft transmitter connecting the computing beam with the said guide bar, an auxiliary lever, L, fulcrumed on the base and having one arm connected with the load lever, and a weight on the other arm of said lever to assist in counterbalancing the load lever, the pan or load receptacle and the draft transmitter, substantially as set forth.

6. In a scale, the combination with the platform, the load supporting lever and the supplemental counterbalancing bar connected with the lever, of a computing beam, a guide bar connected at both ends to the load supporting lever and arranged to vibrate relatively to said lever bodily in horizontal parallelism, and a connection between the computing beam and said bar adapted to move longitudinally of the latter and to pull downward upon the beam, substantially as set forth.

7. In a scale, the combination with the platform, the load supporting lever, and the pivoted counterbalancing bar connected with said lever, of a computing beam, a guide bar connected to the load supporting lever at both ends and vibrating bodily in horizontal parallelism, a block fitted on said guide bar to move longitudinally thereof, and connections between said block and the computing beam and pulling downward thereon, substantially as set forth.

8. In a scale, the combination with the platform, the load supporting lever, and the pivoted counterbalancing bar connected with said lever, of the computing beam, a guide bar connected to the load supporting lever at both ends and vibrating bodily in horizontal parallelism, a block fitted on said bar to move longitudinally thereof, a sliding block on the computing beam, and a loop connected to the sliding block on the guide bar and pivotally connected to the sliding block on the computing beam and pulling downward thereon, substantially as set forth.

9. In a computing scale, the combination of the platform, the load carrying lever below the platform, the computing beam above the platform, the guide, K, the laterally adjustable downwardly pulling connecting device or draft transmitter engaging with the computing beam and supported on the guide, and the knife edges or pivots secured to the weight supporting lever, one at each end of the guide, whereby it is constantly held horizontal, and receiving directly the thrust or draft thereof and permitting it to rock or vibrate relatively to the load supporting lever while connected therewith, substantially as set forth.

10. In a computing scale, the combination of the platform, the centrally mounted longitudinally stationary computing beam above the platform, situated to lie across the longitudinal central plane of the platform, the load supporting lever below the platform, a guide bar, K, vibrating in horizontal parallelism, a support for each end of said bar interposed between it and the load-supporting lever, and a connecting device or draft transmitter supported on the guide bar, K, and engaging with the computing beam, substantially as set forth.

11. In a computing scale, the combination with the frame, the load supporting lever, the platform on said lever, and the longitudinally stationary weighing and computing beam, of supports or carriers connected to the load supporting lever and directly rising and falling therewith, a guide bar, K, connecting the said carriers and supported thereby at both of its ends, means connecting the said guide bar with the weighing and computing beams, all arranged substantially as set forth whereby the load carrying lever is connected to the weighing and computing beams without intervening stationary fulcra, as described.

12. In a computing scale, the combination with the frame, the platform, and the weight supporting lever arranged to have one of its ends rise and fall or swing vertically with the load, of a guide bar resting upon the said bodily rising and falling end of the lever and held at all times in a horizontal position, a price beam above the guide bar, a draft device on the guide bar connected to the price beam and horizontally adjustable on the said guide bar, and a lever or beam pivoted on the frame and connected to the platform lever for counterbalancing it, substantially as set forth.

13. In a computing scale, the combination with the frame, the platform and the weight supporting lever arranged to have one of its ends rise and fall or swing vertically with the load, of a price beam above the platform, a guide bar arranged to be drawn down by the platform lever and connected at both ends thereto, and always situated in horizontal lines, a draft device on said guide bar connected to the price beam and longitudinally adjustable thereon, a supplemental lever or beam pivoted on the frame, an adjustable weight on the said supplemental lever, and flexible connecting devices through which the gravity of the adjustable weight is transmitted to the guide bar, whereby the guide bar can be held up by said weight in a proper position when the scale is unloaded.

14. In a computing scale, the combination with the frame, the platform, and the weight supporting lever arranged to have one of its ends rise and fall or to swing vertically with the load, of a price or computing beam above the lever, a guide bar arranged to be drawn downward by the weight supporting lever and supported at both ends directly thereof, a draft device connecting the said guide bar and the price or computing beam and adjustable longitudinally thereon, a supplemental lever or beam pivoted to the main frame and flexibly connected to the platform lever, and a weight on said supplemental lever for counterbalancing said platform lever, guide bar and draft devices, substantially as set forth.

15. In a computing scale, the combination with the frame, the platform, and the weight supporting lever arranged to have one of its ends bodily rise and fall or to swing vertically with the load, of two independently mounted beams both longitudinally stationary on the said frame, one graduated to indicate weights and arranged above the other and a flexibly connected draft device for drawing down upon said beam when the end of the weight supporting lever moves down, a horizontal guide bar connected at both ends directly to the aforesaid swinging end of the platform lever, and a draft transmitter on said guide bar connected with and longitudinally adjustable along the lower beam, the latter having graduations indicating prices, substantially as set forth.

16. In a computing scale, the combination of a price beam, a platform lever having a widened end, and connecting means between the platform lever and the price beam, an element of said connecting means having a fixed pivotal engagement with the widened end of the platform lever at at least two points.

17. In a computing scale, the combination of a price beam, a platform lever, a guide device (comprising a horizontal guide bar), pivotally connected to the platform lever, having pivotal movement in one direction only, and a horizontally adjustable pivotal connection between the guide device and the price beam and formed in two parts pivotally joined together.

18. In a computing scale, the combination of a price beam, a platform lever having a widened end, a connecting guide bar having a fixed pivotal engagement at its ends with the widened end of the lever, and suitable connection between the guide device and the price beam.

19. In a computing scale, the combination of the supporting frame, the platform, the guide device, the platform lever having a pair of knife edge connections at one end with the framework and a pair of knife edge connections at its other end with said guide device, a pivot support for the platform between said pairs of knife edge connections, a price beam and connections between it and the guide device.

20. In a computing scale, the combination of a price beam fixed against longitudinal movement, a platform lever, a guide device pivotally connected with said platform lever at two points, a slidable connecting member between said guide device and said price beam and formed in two flexibly connected parts, and means for raising said guide device.

21. In a computing scale, the combination of a price beam fixed against longitudinal movement, a platform lever, a guide device pivotally connected with said platform lever, a slidable connecting element between said guide device and said price beam, a counterbalancing beam or lever suitably mounted in the frame-work of the scale, and flexible connections comprising a link through which the force of the counterbalancing beam is transmitted to said guide device.

22. In a computing scale, a price beam in combination with a bifurcated platform lever and suitable connecting means between the beam and lever, said connecting means having pivotal engagement with each of the two arms of the lever, and gravity means independent of the price beam for holding the connecting means and the platform lever up in librating position when the scale is unloaded.

23. In a computing scale, the combination of a price beam, a platform lever, a guide device uniformly held in horizontal parallelism, direct pivotal connections between the guide device and the platform lever, a sliding connection comprising a movable member between the guide device and the price beam, a counter-weight mounted in the frame-work of the scale, and flexible connections comprising a link through which the force of the counter-weight is transmitted to the guide device whereby the counter-weight can hold up the guide device without throwing it out of horizontal parallelism.

24. In a computing scale, the combination of a price beam, a connecting block, a platform lever with two separated connecting points, and an element having separate pivotal engagement with each of said connecting points connecting it with the price beam through said connecting block, and gravity means independent of the price beam for holding the connecting means up in librating position when the scale is unloaded.

25. In a computing scale, the combination of the platform lever, the connecting device pivoted directly to said platform lever at two pivotal points, whereby it is held continuously and uniformly in parallelism horizontally, said guide device being mounted to move independently of the fixed framework, except in so far as it is guided by the platform lever, the price beam, the laterally movable connecting block connecting the guide and price beam and means for balancing said guide with the platform lever independently of the computing beam.

26. In a scale, the combination with a weight receiver or platform, mechanism embodying a lever supporting said platform, a counterbalancing weighted beam or lever connected with said platform lever, and an adjustable weight upon said weighted beam, of a bar connected at both of its ends to the platform lever, and adapted to vibrate bodily in an approximately vertical plane, and in horizontal parallelism, a price beam adjacent to said bar, and a longitudinally movable connection between the price beam and said bar.

27. A price scale comprising in combination a fulcrumed price beam having a value poise thereon, a supporting mechanism for the article to be weighed embodying knife edge pivots, a vertically moving bar adjacent to said price beam, said bar having means at both of its ends connecting it with said knife edge pivots on the supporting mechanism for the article to be weighed, a variable connection between said bar and said price beam, and a lever adapted to counterbalance said bar and said variable connection.

28. In a price scale, the combination of a lever, I, a weight receiving member, said lever, I, being provided at its free end with laterally projecting arms provided, respectively, with knife edge pivots, $d'$ $d'$, a counterbalance lever connected to the lever I, a guide bar mounted adjacent to the price beam, said bar having hinging devices at opposite ends of said bar engaging with said pivots, and a variable connection between said bar and the price beam for changing the rate unit.

29. In a price scale, the combination of a weighted or counterbalancing lever, a platform, a lever I and bar $b$ supporting the platform, said lever I being provided at its free outer end with lateral arms whose extreme ends are provided with knife edged pivots, $d'$, $d'$, a guide bar, hinging devices connecting the ends of said bar to said pivots $d'$, $d'$, connections through which the counterbalancing force of the counterbalancing lever is transmitted to said hinging devices, a price beam mounted adjacent to said guide bar, and a pivoted connection between said bar and said price beam, said connection being variable in relation to the price beam to change the rate unit.

30. In a scale, the combination with the weight receiver or platform and a mechanism comprising a lever supporting said platform, of a bar connected at opposite ends to said lever by ferrules or swinging carriers which also form the supports for said bar and are pivotally connected with the lever, a price beam mounted adjacent to said bar and vertically above said bar and the points of connection between said lever and said ferrules or swinging carriers, a longitudinally movable connection between said bar and price beam, and means independent of said price beam for counterbalancing the weight of said bar and said longitudinally movable connection.

In testimony whereof I affix my signature in presence of two witnesses.

JOHN W. CULMER.

Witnesses:
J. A. FATRO,
G. L. EBERHART.

Copies of this patent may be obtained for five cents each, by addressing the "Commissioner of Patents, Washington, D. C."